United States Patent [19]

Haerle

[11] Patent Number: 5,059,326
[45] Date of Patent: Oct. 22, 1991

[54] FLUID FILTER AND METHOD OF MANUFACTURE

[75] Inventor: Hans A. Haerle, Bopfingen, Fed. Rep. of Germany

[73] Assignee: Schwaebische Huettenwerke GmbH, Fed. Rep. of Germany

[21] Appl. No.: 565,817

[22] Filed: Aug. 9, 1990

[51] Int. Cl.⁵ .............................................. B01D 29/03
[52] U.S. Cl. ................................. 210/491; 210/509; 219/121.13; 219/121.64
[58] Field of Search ................ 210/500.25, 508, 509, 210/488–491; 219/121.63, 121.64, 121.13

[56] References Cited

U.S. PATENT DOCUMENTS

| | | |
|---|---|---|
| 3,161,478 | 12/1964 | Chessin . |
| 3,306,353 | 2/1967 | Burne . |
| 3,904,551 | 9/1975 | Lundsager et al. . |
| 4,062,807 | 12/1977 | Suzuki . |
| 4,064,914 | 12/1977 | Grant . |
| 4,301,012 | 11/1981 | Puckett .................... 210/493.1 |
| 4,329,162 | 5/1982 | Pitcher, Jr. . |
| 4,515,758 | 5/1985 | Domesle et al. . |
| 4,652,286 | 3/1987 | Kusuda et al. . |
| 4,662,915 | 5/1987 | Shiral et al. . |
| 4,683,872 | 8/1987 | Fricker . |
| 4,687,579 | 8/1987 | Bergman . |
| 4,732,593 | 3/1988 | Kondo et al. . |
| 4,758,272 | 7/1988 | Pierotti et al. . |
| 4,760,047 | 7/1988 | Jeschke et al. . |
| 4,889,630 | 12/1989 | Reinhardt et al. . |

FOREIGN PATENT DOCUMENTS

| | | |
|---|---|---|
| 42301 | 12/1981 | European Pat. Off. . |
| 1453653 | 9/1966 | France . |
| 2462188 | 2/1981 | France . |
| 54-128842 | 5/1979 | Japan . |
| 54-152241 | 11/1979 | Japan . |
| 61-287451 | 12/1986 | Japan . |
| 62-225221 | 10/1987 | Japan . |

*Primary Examiner*—Frank Sever
*Attorney, Agent, or Firm*—Welsh & Katz, Ltd.

[57] ABSTRACT

In a process for the manufacture of a filter for liquid or gaseous media, especially for exhaust gases of combustions engines, the filter is formed from one or several filter plates out of a mesh, network, reticulation or fabric of metal wires. The filter body of a plurality of layers or plies of wires is brought between the electrodes of a resistance welding unit and subsequently a resistance welding is performed for partial connection of the wires to one another by spot welding.

29 Claims, 1 Drawing Sheet

FLUID FILTER AND METHOD OF MANUFACTURE

TECHNICAL FIELD

The invention relates to a process for the manufacture of a filter for liquid or gaseous media, especially for exhaust gases of combustion engines, which consists of one or several layers, plies or plates made out of a mesh, network, reticulation or fabric of metal wires; and to a filter thereby manufactured.

BACKGROUND OF THE INVENTION

Filters are already known which consist of a plurality of layers or plies of metal fibers which are sintered together. Sintering is generally done in a furnace or oven under pressure and at a suitably high temperature, care being taken at the same time to provide that a vacuum is present.

A disadvantage of such a process is, however, that this method or process is relatively expensive and frequently, depending on the medium to be filtered, there also exists the problem that arises when the filter plugs or clogs up. Then the filter must either be replaced or cleaned in a costly and/or time-consuming way.

SUMMARY OF THE INVENTION

An object of the present invention is, therefore, to create a process or method for the manufacture or production of a filter, and to thereby provide a filter which is easy to manufacture or produce and which has a good filtering performance or capacity.

According to the invention, this object is solved in that a filter plate consisting of a plurality of plies or layers of wires is placed between the electrodes of a resistance welding device or unit, the wires are pressed against one another, and subsequently a resistance welding operation is performed for partial joining or connecting of the wires to one another.

A filter manufactured or produced in this way can be made in a much simpler and less expensive way than known filters. In the inventive process the manufacture or production can take place in a single operation, with resistance welding devices or units of a known type. During resistance welding, the individual or single wires are spot welded together essentially solely in individual lumps, dots or points in a punctiform structure. Due to this structure, they do on the one hand form a compact unit, but on the other hand, a high flow-through capacity is ensured, for a multiplicity of pores or openings are left available for the filtering operation.

In a simple way, following resistance welding, the filter body can be brought into the desired filter form or shape and, as the case may be, may be formed by connecting several plates into a single filter unit In an improvement of the invention, provision is made for the individual layers or plies to consist of wires having different thicknesses. By this measure, which can be implemented without any problems in the production process according to the invention, the filters can each be optimally matched to the demands made upon them and to the fields of application. They can, for example, be used in the area of the inlet side of thinner and/or finer wires, whereby, in particular in the case of a gaseous medium, entrained particles can immediately be held back or retained on the surface and only a reduced portion or percentage of the smaller particles will be penetrated into the filter medium at all.

This measure has the advantage that a reduction of the filter performance or capacity is thereby avoided, as is the case in the state of the art due to plugging, clogging or fouling of the filter with corresponding particles. On the other hand, coarser and thicker or stronger wires in the central area and/or in the area of the outlet side produce a corresponding strength for the filter body.

It goes without saying that also any other combination of wire thicknesses or strengths can, however, be used when required.

In a simple way, with the process according to the invention, wires with differing material compositions and/or differing coatings can also be welded to one another, which further extends or expands the range of application of the filter according to the invention. In particular, different effects can thereby be exercised on the medium to be filtered. For example, catalytic effects can be achieved, which is of great advantage, particularly for the cleaning of exhaust gases of combustion engines. In this way, other environment polluting substances, such as carbon monoxide, hydrocarbons and nitrogen oxides, can also be removed from the exhaust gas, for example, in addition to soot particles from a diesel engine. For this purpose it is solely necessary to provide at least single plies or layers of the filter body with coatings of platinum, rhodium, vanadium or another material or substance having a catalytic effect.

In a further very advantageous improvement of the invention, provision can be made for powdery, grainy or chip-like particles to be applied to the surface of the individual layers or plies or their wires, preferably by a sintering operation.

Through the additionally applied particles, the separating effect is significantly increased. Due to the particles, a distinct enlargement of the wire surface is achieved, with which a many times larger adsorption area, and thus a significantly larger separating area, is made available. At the same sintering capacity, the thickness of the individual filter plies or layers can, for example, in this way be significantly reduced.

A further advantage through the application of the particles lies in the fact that where required, depending upon the planned application, the particles to be applied can also be correspondingly selected. These may, for example, consist of metal, of plastic, or of ceramic materials, or even of mixtures thereof.

In an application as a catalytic converter body, particles are used, for example, which have catalytic properties, such as platinum, rhodium or vanadium.

The particles themselves can be introduced into the filter body in any way desired. For example, they can be introduced through a viscous carrier liquid. Likewise, shaking-in is possible or an introduction by means of an electrical and/or magnetic charging of the layers or plies and a subsequent doping with the particles.

In case of need, the sintering operation can be selected so that in addition to a sintering-on of the individual particles onto the surface of the layers or plies or wires, the wires are also sintered at points or spots to one another and in this way form a more stable unit or whole.

Resistance welding of the wires to one another can take place in different ways.

If plates or bodies of a well-defined or definite size are manufactured, for production in one single operation electrodes can be provided, which are at least as large as the filter plate to be formed. If then the filter plate or body to be welded is brought between the two electrodes, as the electrodes come near to each other and press the individual or single layers or plies, a filter plate or body of a well-defined or definite size can be produced in one single operation.

In the same way, the manufacture of a plurality of plates or bodies from one band or strip is possible, which is then pushed through stepwise or cyclewise between the electrodes. In this way any desired size of filter plate can be obtained by an appropriate separation of individual plates or units.

If the electrodes are formed as rotating rolls, a band or strip of any desired length can be formed in a continuous operation, with this strip having to be pulled through between the two opposing rolls solely under pressure.

A very advantageous and not obvious improvement of the invention consists in that the wires are pressed, prior to resistance welding, out of their generally round or circular cross-sectional shape into a flat shape and more preferably into an at least approximately rectangular form or shape. In this way one obtains a considerable surface enlargement and thus a larger filtering area, and from this in turn there results a high filtering capacity or performance. This can be achieved with little effort or expense.

A further increase in the filtering capacity or performance is produced, if provision is made for the flat-pressed surfaces also to be profiled. In this way, for example, a wave-shaped profile can be pressed in, with which the surface becomes even larger.

DETAILED DESCRIPTION OF THE INVENTION

Figure 1:
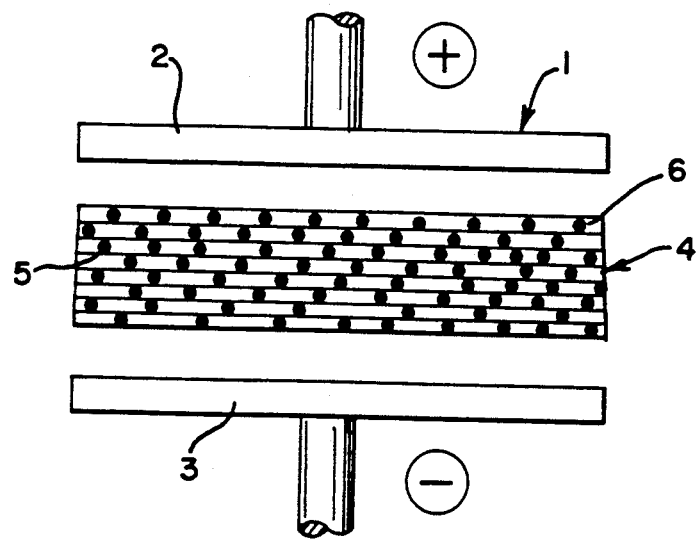
Figure 2:
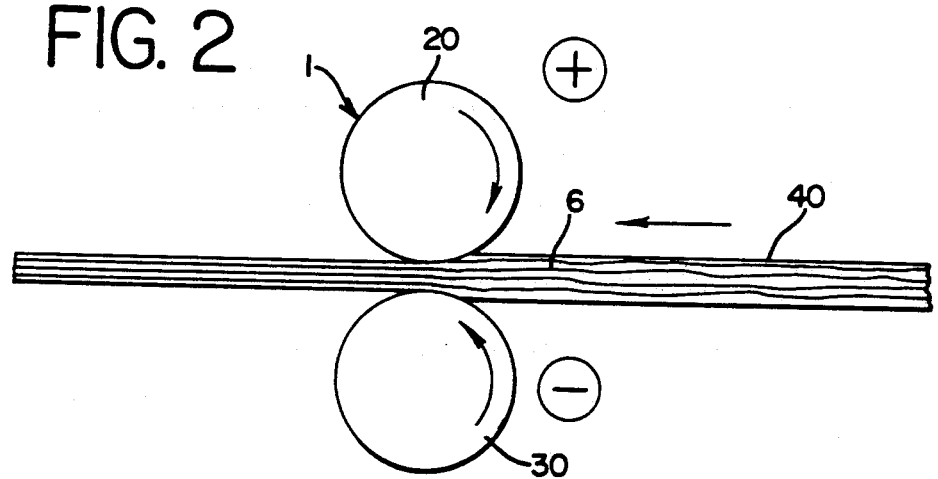
Figure 3:
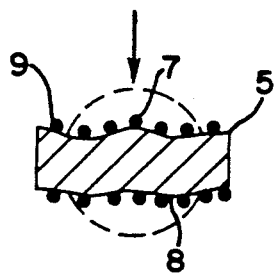

The following Figures show:
FIG. 1: A filter plate in a resistance welding unit;
FIG. 2: The manufacture of a strip of filter network for producing filter plates or bodies in a continuous production operation.
FIG. 3: An enlarged representation of a deformed profiled wire in cross-section; and,
FIG. 4: A filter made of a wire network having different size wires.

FIG. 1 shows schematically the manufacture of an individual or single filter plate or body in a resistance welding unit 1 having a positive electrode 2 and a negative electrode 3, each in plate form. The two electrode plates or bodies 2 and 3 possess a size which corresponds to the size of the filter plate or body 4 to be manufactured which lies between the two electrodes. The filter plate 4 consists of a plurality of layers or plies 6 of single or individual wires 5, each of which are connected to the others in every position by longitudinal and transverse wires to form a mesh, network, reticulation or fabric.

If the two electrode plates 2 and 3 are now brought closer together, and a pressure is exerted on the interposed filter plate or body by the electrode plates 2 and 3, with the resistance welding taking place simultaneously, the individual or single wires 5 join together in the layers or plies. Also, the individual layers 6 join together during the welding. Thus a firm or solid and uniform filter plate or body 4 is formed. This filter plate 4 can subsequently be brought into the desired filter form or shape.

FIG. 2 shows a manufacturing or production process of plates or bodies 4 out of a continuous band or strip 40 pushed through continuously between two rotating electrode rolls or rollers 20 and 30 under pressure in the direction of the arrow. The band or strip is likewise built up from a plurality of layers or plies 6 with longitudinal and transverse wires, the only difference to the manufacturing or production process shown in FIG. 1 being that filter plates or bodies can be subsequently separated from the band or strip in the desired size and shape or form.

FIG. 3 shows the shape or form of an individual or single wire 5, which is brought out of a wire with a round or circular cross-section (shown in broken lines) into an essentially rectangular form or shape prior to resistance welding. This can be done in any desired way. As can be further seen with FIG. 3, the effective filter wire surfaces 7 and 8 are also profiled in the shape of waves as inflow and, as the case may be, outflow sides (see direction of arrow), resulting in a further surface enlargement.

Also shown in FIG. 3 by means of points or dots is a doping of the layers or plies 6 or their single or individual wires 5 with small particles 9, which are applied to the filter wire surfaces 7 and 8, for example, by a "flooding-in" by means of a viscous liquid. The connection of the particles 9 to the individual or single wires 5 can be accomplished by a sintering operation in a way known per se.

Figure 4:
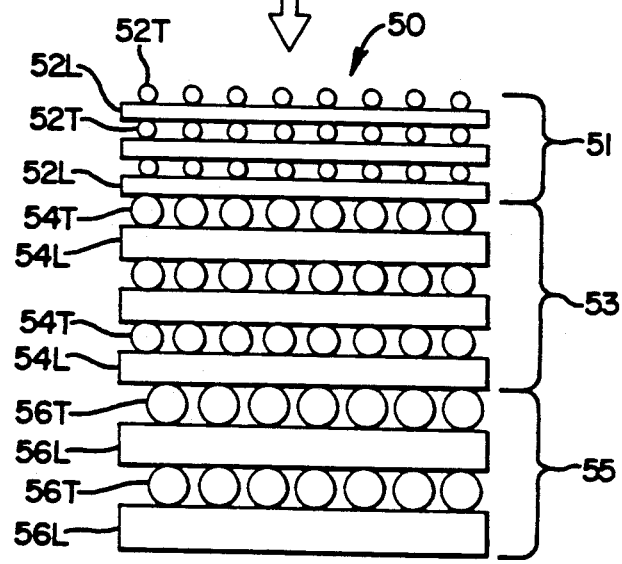

FIG. 4 shows a composite filter body 50 made of wires having different thicknesses. The filter body is made of three individual plates or sections 51, 53 and 55. Section 51 is made of a plurality of longitudinal wires 52L and transverse wires 52T which have the smallest diameter, section 53 is made of a plurality of longitudinal wires 54L and transverse wires 54T which have an intermediate diameter, and section 55 is made of a plurality of longitudinal wires 56L and transverse wires 56T which have the largest diameter. The spaces between the wires of the wire network are of the largest size in section 51, of intermediate size in section 53, and of the smallest size in section 55. Thus, the flow of gas containing entrained particles, as shown by the arrow, will enter section 51 which retains the largest particles with some intermediate and small particles, pass through section 53 which retains intermediate size particles with some small particles, and exit from section 55 which retains the smallest particles.

I claim:
1. A process for manufacturing a filter for liquid or gaseous media, such as exhaust gases of combustion engines, which includes at least one filter plate made out of a mesh of metal wire, comprising the steps of positioning a plurality of layers of wire between the electrodes of a resistance welding unit, pressing the wires of the layers onto one another, providing an alternative to sintering by resistance welding the pressed wires of adjacent layers for at least a partial connection of the pressed wires to one another to form a multilayer filter plate structure, and transforming the resulting multilayer filter plate structure into a desired filter plate form and shape.

2. Process according to claim 1 wherein the individual layers comprise wires with different thicknesses.

3. Process according to claim 2 wherein the wires in the inlet portion of the filter plate possess a smaller diameter than the wires in the central portion of the filter plate and in the outlet portion of the filter plate.

4. Process according to claim 3 wherein the wires in the central portion of the filter plate possess a smaller diameter than the wires in the outlet portion of the filter plate.

5. Process according to claim 1 wherein the wires in the layers comprise different materials.

6. Process according to claim 1 wherein particles selected from the group consisting of powdery, grainy and chip-like particles are applied to the individual single layers and their wires as a surface coating.

7. Process according to claim 6 wherein the particles are sintered on the surface of the wires.

8. Process according to claim 1 wherein the wires are pressed flat prior to resistance welding.

9. Process according to claim 8 wherein wires of circular cross-section are brought into a substantially rectangular form having flat pressed surfaces.

10. Process according to claim 9 wherein the flat pressed surfaces of the wires are profiled.

11. Process according to claim 1 wherein the electrodes of the resistance welding unit are at least as large as the filter plate being formed.

12. Process according to claim 1 wherein the plurality of layers of wire is produced in the form of a strip which is gradually passed through and between the electrodes of the resistance welding unit.

13. A filter for liquid and gaseous media, such as exhaust gases of combustion engines, which is formed of at least one filter plate comprising a mesh of metal wires, wherein each said filter plate contains means for providing an alternative to sintering including a plurality of layers of metal wires connected partially to one another by means of resistance welding.

14. A filter according to claim 13 wherein wires of different thicknesses are contained in each said filter plate.

15. A filter according to claim 13 wherein the wires deviate from the circular form and posses a rectangle-like cross-sectional shape.

16. A filter according to claim 15 wherein the surfaces of said wires are profiled.

17. A filter according to claim 13 wherein the surfaces of the wires are coated with a different material.

18. A process for manufacturing a filter for liquid or gaseous media, such as exhaust gases of combustion engines, which includes at least one filter plate made out of a mesh of metal wires, comprising the steps of passing a plurality of layers of wires between the electrodes of a resistance welding unit, said electrodes comprising a pair of rotatable electrode rollers; pressing the wires of the layers onto one another with said electrode rollers; providing an alternative to sintering by resistance welding the pressed wires of adjacent layers for at least a partial connection of the pressed wires to one another to form a multilayer elongated strip filter plate structure of wire mesh; and transforming the elongated multilayer strip filter plate structure into a desired multilayer filter plate form and shape.

19. Process according to claim 18 wherein the individual layers comprise wire with different thicknesses.

20. Process according to claim 19 wherein the wires in the inlet portion of the desired multilayer filter plate possess a smaller diameter than the wires in the central portion of the desired multilayer filter plate and in the outlet portion of the desired multilayer filter plate.

21. Process according to claim 20 wherein the wires in the central portion of the desired multilayer filter plate possess a smaller diameter than the wires in the outlet portion of the desired multilayer filter plate.

22. Process according to claim 18 wherein the wires in the layers comprise different materials.

23. Process according to claim 18 wherein particles selected from the group consisting of powdery, grainy and chip-like particles are applied to the individual single layers and their wires as a surface coating.

24. Process according to claim 23 wherein the particles are sintered on the surface of the wires.

25. Process according to claim 18 wherein the wires are pressed flat prior to resistance welding.

26. Process according to claim 25 wherein wires of circular cross-section are brought into a substantially rectangular form having a flat pressed surface.

27. Process according to claim 26 wherein the flat pressed surfaces of the wires are profiled.

28. Process according to claim 18 wherein the rotatable electrode rollers of the resistance welding unit are at least as wide as the multilayer filter plate being formed.

29. Process according to claim 18 wherein said multilayer strip filter plate structure produces filter plates in a continuous production operation.

* * * * *